Patented May 3, 1938

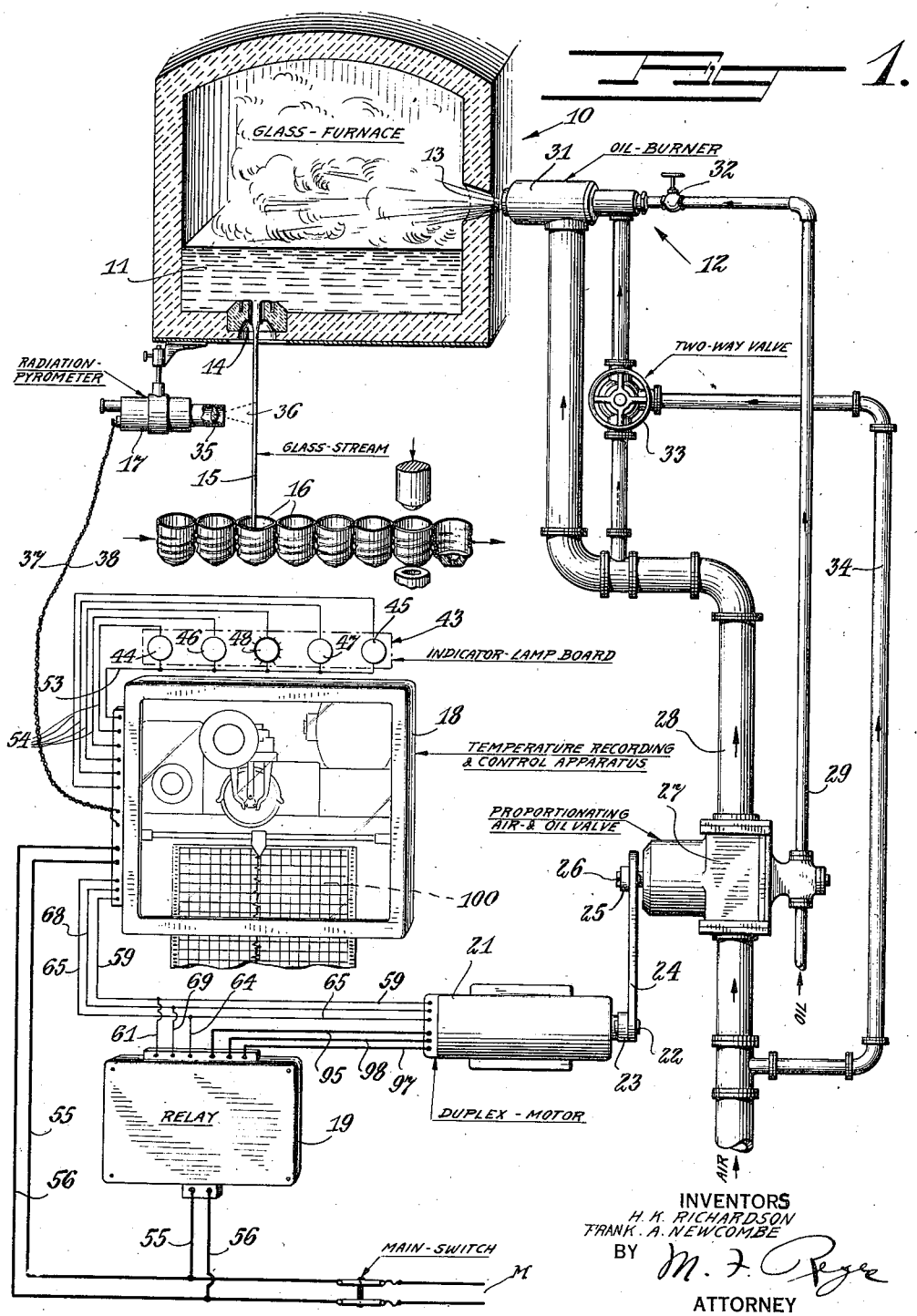

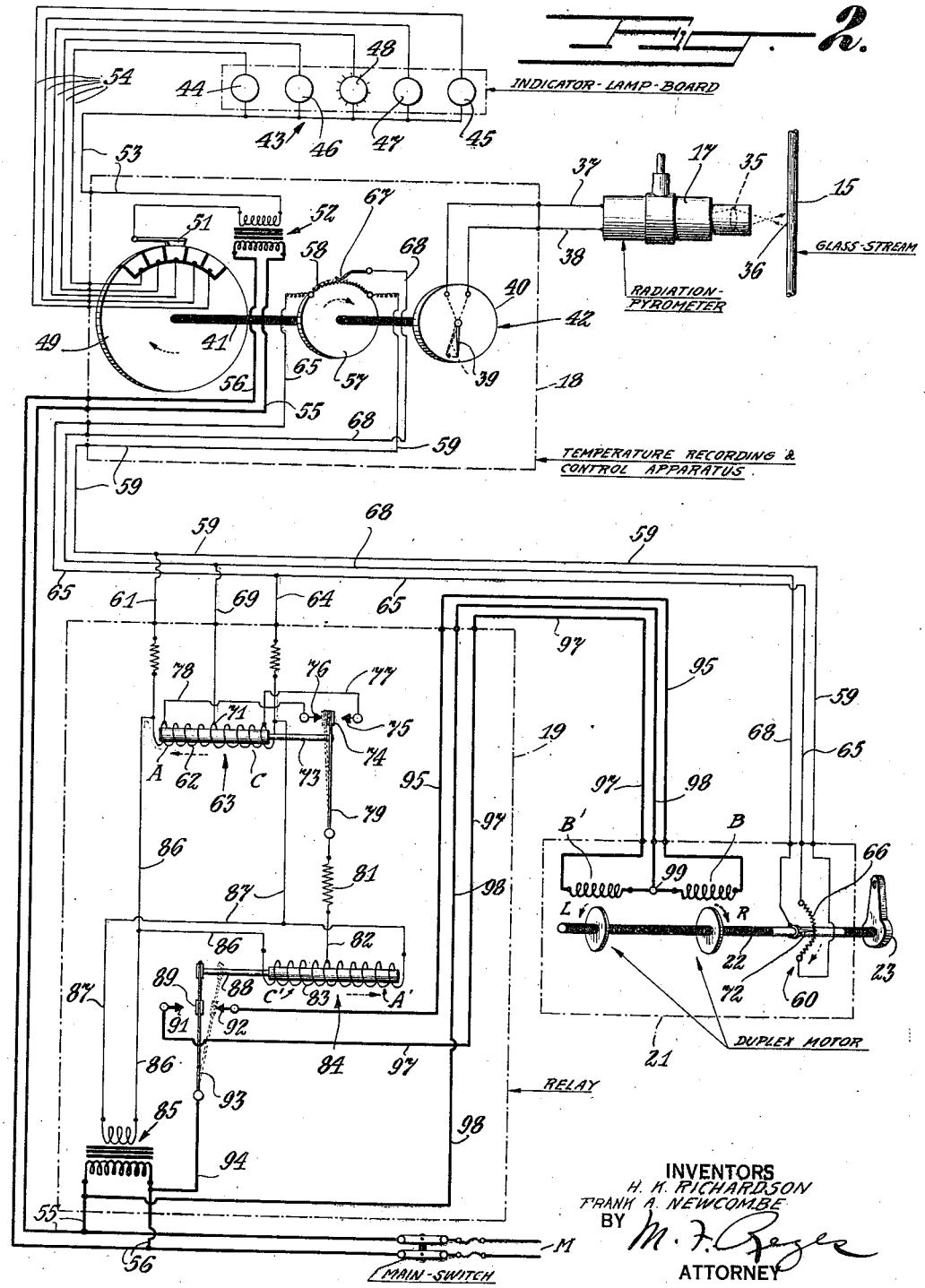

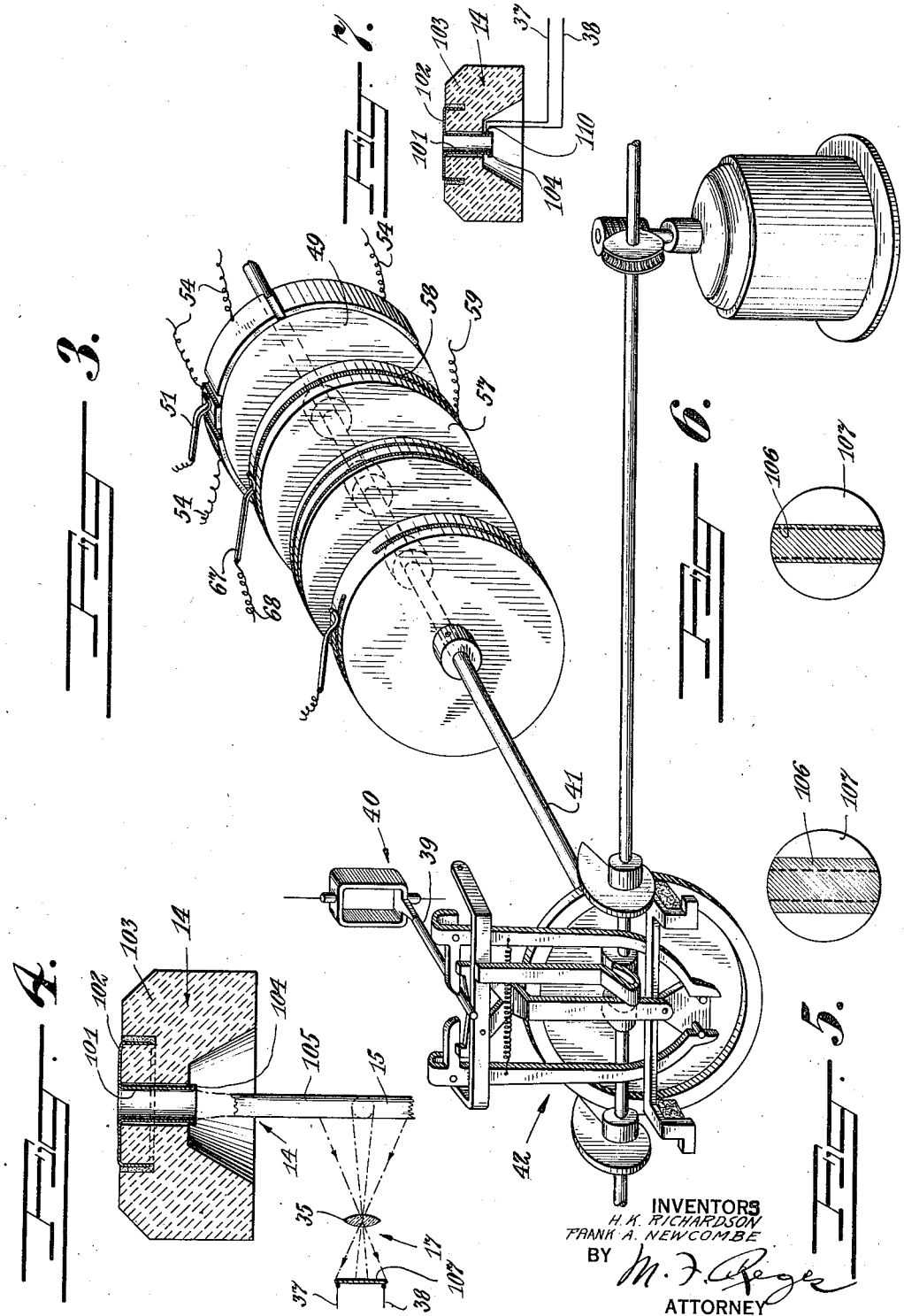

2,116,450

UNITED STATES PATENT OFFICE 2,116,450

TEMPERATURE CONTROL FOR MOLTEN STREAMS

Henry K. Richardson, Bloomfield, and Frank A. Newcombe, Nutley, N. J., assignors, by mesne assignments, to Westinghouse Electric and Manufacturing Company, East Pittsburgh, Pa., a corporation of Pennsylvania Application December 28, 1934, Serial No. 759,444

19 Claims. (Cl. 236—15)

This invention relates to an apparatus and method for maintaining a predetermined temperature in a furnace for molten material and more particularly to the temperature and volume control of a stream of molten vitreous material.

Although the present invention may be useful in industries where it is necessary to control the volume and temperature of flowing molten materials, it is of particular advantage in the glass industry where a stream of molten glass is delivered to a mold or deposited in a receptacle.

In the selected embodiment of the invention the apparatus is employed in connection with a stream of glass which is delivered to metallic lamp bases in such manner that each base receives a definite amount of glass to constitute an insulative web.

In the manufacture of incandescent electric lamps it is necessary to provide a lamp base which, according to standard practice, is in the form of a metallic screw threaded shell having one end open to receive the bulb neck and the other end of reduced diameter to receive a quantity of glass in which a contact member is imbedded, the glass serving as an insulative bottom for the base and to support the contact member out of electrical contact with the metallic shell.

Incandescent electric lamps are manufactured at a high rate of speed and in making bases for such lamps it is necessary to be able to deposit a definite amount of glass in bases which are intermittently moved beneath the glass stream. It is essential, for the purpose of maintaining highspeed production, to move the bases at the highest possible speed permitted and at the same time assure a definite quantity of glass for each base.

It will be understood that the glass stream must be maintained at a temperature sufficiently high to permit the molten glass to flow freely. It is also obvious that any variation in the temperature of the glass stream which causes a variation in the rate of flow will result in varying the amounts of glass deposited in the bases. If this variation in deposit persists to any considerable degree, the bases become unsatisfactory either by reason of a web of too great a thickness or a lack of sufficient material to make a practical insulative closure.

The above mentioned disadvantages have existed for many years and, although the manufacture of bases was possible by reason of careful and painstaking control, the degree of shrinkage, or loss by reason of imperfect production, existed to such an extent as to appreciably increase the manufacturing cost of the product.

Attempts have been made to control the temperature of the flowing stream of molten glass by the use of heat responsive elements within the furnace which operated to vary the temperature of the furnace and consequently the temperature of the glass stream. It was found, however, that owing to the variation in the diameter of the glass stream caused by conditions other than temperature conditions, it was impossible to provide the necessary accurate temperature control.

In solving the problem of obtaining accurate temperature control, it was necessary to first correct the conditions which had heretofore made it impossible during continued operation to physically hold the stream of flowing glass at a definite area in transverse cross section. It has long been the practice to guide the flowing glass from the glass furnace by means of an outlet or orifice, which orifice was commonly called a die, and which was composed of porcelain.

Obviously, the die is subjected to extremely high temperatures and it is necessary that such a die be made of a material of a sufficiently high melting point. Porcelain dies were, therefore, employed and, when initially installed, the outlet orifice was made of a definite dimension to give a stream of glass having a predetermined area in transverse cross section.

In spite of the best materials that could be obtained it had heretofore been impossible to obtain a die of porcelain or other refractory body which would resist the wear imposed by the rapidly flowing high temperature material. The rate of flow of the material, together with the high temperature, caused a wearing away or erosion of the guiding surface of the die, this increased the size of the flow outlet and, obviously, changed the cross sectional area of the stream of molten material. Porcelain or other dies of similar materials had to be replaced or plugged frequently and, owing to the variation in the outlet opening, it was impractical to attempt to control the flow of molten material in accordance with the temperature of the stream.

This detrimental condition was overcome by providing a die composed of an alundum refractory having a flow aperture lined with an alloy possessing the necessary properties to resist heat and wear. As shown and described in our copending application, Serial No. 645,190, filed December 1, 1932, it was found that an alloy consisting of ten percent rhodium and ninety percent of platinum gave satisfactory results, in that molten glass flowing through this lined aperture would be physically held to a definite predetermined area in transverse cross section. By making the lining for the aperture extremely thin, such as a thickness of .030 inch, and by reason of the refractory backing, no appreciable heat losses occur during the passage of the glass stream through the die.

In accordance with the present invention, a die which operates to maintain a uniform outlet orifice is utilized in combination with heat responsive means operating in accordance with variations in the temperature of the flowing material to vary the degree or amount of heat supplied for heating the material to cause it to flow.

As above mentioned, it has heretofore been proposed to regulate the temperature of a glass furnace by heat responsive means applied directly to a batch of glass in the hearth in an attempt to control the temperature of a stream of glass flowing from the hearth but no successful efforts had heretofore been made to control the temperature of the stream by heat responsive means applied directly to the stream. As the molten material leaves the die it necks down to a smaller diameter and then increases in diameter for a large portion of its length as will be hereinafter more fully described.

It will be evident that to control the temperature of the stream the best results are obtainable by measuring the variations in the temperature of the stream and controlling the temperature of the furnace accordingly. In accordance with the present invention, means responsive to radiations from a portion of the stream are employed. The heat responsive means are preferably in the form of an electric thermocouple provided with a target on which the light image of a portion of the stream below the necked portion is projected and the various elements are so constructed and arranged that the projected image is of less area than the area of the target.

The thermocouple may, therefore, be responsive to cause a flow of electrical energy when the image of a stream of a predetermined diameter at a given temperature is projected on the target. If the temperature rises, the flowing material becomes more mobile and flows faster, increasing the diameter of the stream below the necked-down or attenuated portion adjacent to the outlet orifice of the die. Thus a greater area of the target is subjected to radiations and more heat is absorbed with a consequent increase in the flow of electrical energy. This variation in the degree of electrical energy flowing through a provided circuit is utilized to regulate the heat source for the furnace and the temperature of the stream is, therefore, held within given limits.

In an apparatus constructed to supply small amounts of glass to lamp bases, the furnace may be relatively small and, in fact, may be of the capacity of the usual hearth employed in connection with glass furnaces wherein one section is used to melt a large batch of glass and an auxiliary section or hearth is employed in which the glass is heated to the desired temperature.

Although relatively small glass streams, as for example, from about $\frac{1}{32}$ of an inch diameter to about $\frac{1}{8}$ of an inch diameter, may be controlled by means of a radiation pyrometer, it is also possible to control the temperature of larger streams; as for example, streams of such diameter that the projected image covers the entire target of the thermocouple. Under the conditions where the projected image of the glass stream covers only a portion of the target, the temperature of the stream is controlled by reason of its direct variation in temperature and by reason of the fact that the area of the image becomes greater as the temperature increases.

Under conditions where the stream is of such diameter that the image covers the entire target, control is possible solely by reason of the variation in temperature. Although the stream may increase in diameter below the outlet orifice as the temperature rises, the increase in diameter is small by reason of the outlet orifice which is so constructed that the glass stream issuing therefrom is always maintained at a definite predetermined cross sectional area.

Where the streams are of a relatively large diameter, however, the variation in temperature is not as critical as with the small diameter streams above mentioned. In the cases of small streams, care must be taken that the temperature does not rise to such a degree as to melt or otherwise destroy the brass shells into which the stream is directed.

It will be evident that the results attained, by reason of the present invention, are accomplished through the novel arrangement and cooperative combination of the various elements employed.

It is an object of the present invention to provide a method of controlling the temperature and volume of a stream of molten glass, by causing heat radiated from a portion of the stream to vary the amount of heat energy supplied to heat the stream.

Another object of the invention is to provide a method of controlling the temperature of a stream of molten material, wherein an image of a portion of the stream is projected onto a surface for causing a flow of electrical energy, in accordance with the amount of absorbed heat energy and in utilizing the variations in the area of the image to vary the flow of electrical energy.

A further object of the present invention is to maintain a stream of molten flowing material at a definite predetermined cross sectional area, and in utilizing heat radiated from a definite portion of said flowing material to hold the temperature of said material within definite limits.

A still further object of the invention is to provide a glass furnace with an unvarying outlet aperture for a stream of molten glass, and means responsive to the temperature of said glass stream for controlling the temperature of said furnace.

Another object of the invention is to maintain a stream of molten glass within a definite temperature range by heat responsive means disposed adjacent to the path of movement of said stream and operative upon variations in the temperature of said furnace.

Other objects and advantages of the invention will be more clearly understood by reference to the accompanying drawings in which Fig. 1 is a diagrammatic view showing, in cross section, a glass furnace heated by an oil burner controlled through the agency of electrically actuated mechanism operable upon the flow of electrical energy caused by temperature variations in a stream of molten material;

Fig. 2 is a diagrammatic view showing an electrical circuit for the flow of current controlled through the agency of a radiation pyrometer disposed adjacent a flowing glass stream;

Fig. 3 is a fragmentary perspective view of a temperature recording device;

Fig. 4 is an enlarged cross sectional view of an outlet orifice or die;

Fig. 5 is a diagrammatic view representing an image projected on a target of a heat responsive instrument;

Fig. 6 is a view similar to that shown in Fig. 5 but with an image of lesser area and Fig. 7 shows another form of control in which an electric thermocouple is mounted on or in close proximity to the die and is directly acted upon during variations in the temperature of the stream.

The present invention may be applied to any suitable form of glass furnace such as the furnace indicated by the numeral 10 in Fig. 1. A quantity of glass 11 in the furnace is heated by an oil burner 12 which projects flames through an aperture 13. The furnace 10 is in the form of a closed chamber and the pressure created above the surface of the molten material tends, in addition to the force of gravity, to cause the molten glass to flow through the aperture or outlet orifice 14 in the form of a stream 15 which is delivered to bases 16.

In practice, the bases 16 are disposed on a conveyor which carries a plurality thereof and moves them successively beneath the stream of molten glass, holding each base for a time interval sufficient to make the necessary deposit of glass. Machines for delivering bases to position to receive the glass are well known in the lamp making art. Adjacent to the path of travel of the molten glass is disposed a radiation pyrometer 17 electrically connected with a temperature recording and control apparatus 18 of any suitable type, the one shown being generally the same as that shown and described in Patent 1,356,804 issued October 26, 1920 to Henry Brewer, and entitled "Control apparatus".

The temperature control device, in accordance with the present invention, is electrically connected with a relay 19 which serves to cause electrical energy to operate a duplex motor 21. Shaft 22 of the motor is provided with a lever arm 23 which connects with one end of a link 24. The other end of the link 24 is pivotally connected with a lever 25 on stem 26 of a proportioning air and oil valve 27. The valve 27 is arranged to control the flow of air in a conduit 28 and the flow of oil in a conduit 29. The conduits 28 and 29 terminate in oil burner nozzle 31. A hand valve 32 is provided in the oil line for manual regulation and a two-way valve 33 is provided for by-passing air through a by-pass pipe 34. Electrical circuits for operating the various mechanisms are shown diagrammatically in Fig. 2.

The radiation pyrometer 17 disposed adjacent to the moving glass stream 15 is provided with a lens 35 of any suitable heat resisting material such, for example, as quartz, and is focused on a definite portion 36 of the glass stream. The heat waves radiated are concentrated by means of the lens and directed upon a thermo-couple electrically connected with conductors 37 and 38. The pyrometer may be of any standard make. The type found desirable to use is a supersensitive pyrometer in a water jacket.

Such a pyrometer as constructed for general use has a response of 16 millivolts when sighted on a one-inch diameter surface at 1300 degrees centigrade. When sighted on a ⅛-inch stream the response is 3 to 4 millivolts, while for a $\frac{1}{32}$-inch stream a flow of electrical energy of from only 1 to 1.5 millivolts is obtained.

In the present construction wherein the arrangement of the optical system includes a condensing lens, the holding tube is lengthened whereupon the response is raised to from 2 to 3 millivolts when focused on a $\frac{1}{32}$-inch diameter stream. At the point of use, about 1200 degrees centigrade, 0.1 millivolt corresponds to from 5 to 5.6 degrees centigrade.

The flow of electrical energy resulting from an elevation in the temperature of the thermocouple in the pyrometer, causes a fluctuation of a needle 39 of a galvanometer 40 constituting part of the temperature control recorder instrument 18. A movement of the needle 39, see Figs. 2 and 3, results in a rotation of a shaft 41 in clockwise or counterclockwise direction, depending upon the directional movement of the needle 39. The operation of the shaft 41 is effected by means of the mechanism 42 shown in Fig. 3, which mechanism is well known and clearly described in the above mentioned patent. Any variation, therefore, in the temperature above or below a predetermined degree, will cause the shaft 41 to rotate either in a clockwise or a counterclockwise direction.

For the purpose of giving a visible indication to the operator of any variation in the temperature of the flowing material, a bank of lamps 43 is provided. Lamps 44 and 45 are colored red as an indication of an extremely excessive or detrimental temperature. Lamps 46 and 47 are colored green indicating a slight variation in temperature and lamp 48 may be colored amber indicating the desired operating temperature.

The lamps are connected in parallel and all connect with contacts on a disc 49 mounted on the shaft 41 so that as the shaft rotates, a contact member 51 will engage with one of a number of contacts corresponding with the number of lamps to cause electrical energy to flow through a given lamp depending on the position of the disc 49 and by reason of the greater or lesser movement of the disc the proper indicating signal will be given.

The contact member 51 is connected with one side of a secondary of a transformer 52, the other side of the secondary being connected by a conductor 53 with one of the contacts of the lamps, the other contacts of the lamps being connected by conductors 54 with their respective contacts on the disc. The transformer 52 is provided with electrical energy by means of conductors 55 and 56 connected with a suitable main source of electrical energy supply indicated by the reference character M.

For the purpose of controlling the oil burner to vary the fuel supply, and thus control the temperature of the furnace, the shaft 41 is provided with a potentiometer disc 57 upon which is mounted a resistance 58. One side of the potentiometer is connected with a conductor 59 which is connected by means of a conductor 61 to one side of a coil 62 of a duplex relay 63. The other side of the coil 62 is connected by means of a conductor 64 with conductor 65, connecting to the opposite end of the resistance 58.

The conductor 59 also connects to one side of a resistance element 66 of a balancing potentiometer 60 controlled by a movement of the shaft 22 of the duplex motor 21. The other side of the resistance 66 is connected to the conductor 65. The flow of electrical energy, through the resistance element 58, relay coil 62, and balancing potentiometer 66, is controlled by means of a contact 67. This contact is connected by means of conductor 68 with the conductor 69 which connects with the center tap 71 of the relay coil 63 dividing the coil into what may be termed relays A and C. The said conductor 68 also connects with a contact member 72 of the balancing potentiometer 60 mounted on, but insulated from, the shaft 22 of the motor 21. The operation of the contact 72 will presently be described.

The relay 63 is provided with an armature 73 which carries a contact 74 movable between contacts 75 and 76. The contact 75 is connected by conductor 77 with one end of the coil 62 and the contact 76 is connected by conductor 78 at the other end of the coil 62. The movable contact 74 is mounted on a conductive spring member 79 connected to a resistance 81 and conductor 82 to the center point of a coil 83 of a power relay 84, dividing this relay into separate relays A' and C'. The relay 63 serves to operate the relay 84 for the flow of electrical energy from the line M through conductors 55 and 56, electrical energy for operating both of the relays being furnished by means of a transformer 85 through the agency of conductors 86 and 87.

The relay 84 is provided with an armature 88 which operates a contact 89 movable between contacts 91 and 92. The contact 89 may be mounted on a resilient conductive support 93 electrically connected by means of conductor 94 with conductor 56 of the line. Contact 92 is connected by means of conductor 95 with one side of the duplex motor 21. The other side of the motor is connected by means of conductor 97 with the contact 91.

For completing the flow of electrical energy through either side of the duplex motor a conductor 98 is provided and connected to and between the motors at 99 and to the conductor 55 of the main line.

When operating the present apparatus the glass in the furnace may be heated, by the oil burner 31, to such a temperature as to become fluid and of such viscosity as to flow through the die 14 in the form of a stream 15. The pyrometer which is focused on the travelling molten glass is affected by radiant energy and current is caused to flow and operate the needle 39 of the galvanometer on the control apparatus 18.

The position of the radiation pyrometer with respect to the glass stream is important since, as the molten glass flows from the die it necks-down quickly from the die exit and becomes cylindrical all the way down after about six inches below the die. In the case of a die aperture of .756 of an inch, the glass cylindrical stream is about 1/8 of an inch in diameter.

Apparently about six inches below the die exit the acting forces become balanced so that a constant volume is flowing past a given point during a given time interval and it has been found that the temperature of the first eighteen inches below the six-inch point is substantially uniform. This condition is possible by the use of a die constructed as disclosed in the above mentioned copending application. A more detailed description of the die will be given hereinafter.

The temperature of the flowing stream is determined by the optical pyrometer which may be provided with graphic recording means 100 as used in commercial temperature recording instruments. When starting, the control valves of the oil burner are manipulated until the temperature of the flowing stream is brought to the center setting on the control apparatus 18. When the above initial adjustments have been made further attention is unnecessary with the exception that it is desirable to occasionally wipe off the quartz lens at the front of the pyrometer.

When attempting to obtain a radiation pyrometer for the present service, it was found that ordinarily such pyrometers might be used for a stream of 1/8 of an inch diameter. With a stream of 1/32 of an inch diameter, however, the millivoltage developed was too small. In the present pyrometer, the optical system was changed by lengthening the tube holding the lens. In this way the image on the target was enlarged and sharpened.

As hereinbefore mentioned, under certain conditions it is necessary to have a very fine glass stream of 1/32 of an inch diameter or less where it is desired to deposit a small amount of glass in a base of small size. Obviously, lamp bases vary in sizes from the miniature type of base to the large mogul type and, by reason of the present modified form of pyrometer, it is possible to obtain an effective current flow from both the large and small streams.

Assuming that the proper initial settings have been made and that the contacts 67 and 72 of resistances 58 and 66, respectively, of the potentiometers are set in central positions, as shown, the contacts will remain in these positions when the flowing material is at a predetermined selected temperature. Electrical energy flows through the potentiometers and the relays, but the relays, by reason of their balancing relation, do not operate since their armatures are held in retracted positions by reason of the balanced fields.

If the temperature of the flowing material falls below that set for effective operation, the needle 39 of the galvanometer will move in the direction as indicated in dotted lines, operating the control mechanism 42 and causing the shaft 41 to rotate in a clockwise direction. It will be understood that in Fig. 2 the representation of the galvanometer needle is diagrammatic and indicated on the shaft 41 for the sake of clearness. In the mechanism employed, movement of the needle 39 causes the operation of intermediate elements which cause an operation of the shaft 41.

A rotation of the shaft 41 causes the resistance 58 to move, cutting out the balancing resistance in the circuit including conductors 65 and 68, permitting more current to flow through section A of coil 63. This results in a movement of the armature to bring a contact 74 into engagement with contact 76, closing the circuit including coil A' of the relay coil of power relay 84. Thus the armature 88 is retracted to bring contact 89 into engagement with contact 92, closing the circuit including conductors 94, 95 and 96, energizing motor B of the duplex or reversible motor 21.

The shaft 22 of the motor is thus rotated, operating the lever 23 to open the proportionating air and oil valve to supply more fuel to the furnace and thus elevate the temperature of the molten material. As the shaft 22 turns, the needle 72 of the potentiometer 60 moves over the resistance 66 until the sum of the effective resistance in the potentiometer resistance 66 and the effective resistance in the potentiometer resistance 58 balances the circuit.

As above mentioned, the resistances 58 and 66 are in parallel and, as soon as the pointer or contact 72 reaches a position to balance the potentiometers, the added current flow in the coil A of relay 63 is terminated and the relay coils become balanced and the armature 73 takes a position to open the circuit including section A' of the power relay 84. The armature 88 of this relay then takes its initial position, opening the circuit including conductors 95 and 98 thus terminating the operation of motor B. This leaves the circuit substantially inoperative.

If the temperature of the flowing material increases, the needle 39 of the galvanometer moves in a counterclockwise direction and the shaft 41 rotates to move so that the resistance 58 is moved so as to put a greater resistance in the circuit, including the conductors 65 and 68, which unbalances the potentiometers of the circuit, since the pointer 72 of the resistance 66 remains inoperative. When more resistance is put in the circuit, including the conductors 65 and 68, then more current flows in the circuit including conductors 68 and 59, thus causing more current to flow in section C of the relay 63 and causing the movable contact 74 to move against contact 75, and close the circuit including the coil section C' of relay 84.

The armature 88 is then projected and contact 89 engages contact 91 to close the circuit including conductors 97 and 98, causing a flow of current in motor B' whereby shaft 22 is rotated to move the lever 23 in a reverse direction to cut off the fuel supply. At the same time potentiometer needle 72 moves until a balancing condition of the potentiometers is effected causing a termination of the flow of current in the relays 63 and 84, and, obviously, terminating the current flow which operates the motor. By reason of the reduction in the amount of fuel supplied to the furnace, the temperature of the molten material is reduced and the temperature of the glass stream is controlled.

The above novel arrangement of electrically operable elements serves to provide a full automatic control of the temperature of the stream of molten material. By reason of the present apparatus, an extremely fine degree of control is attainable so that the temperature and diameter of the stream are held within narrow limits. This is made possible by the use of the orifice outlet or die 14 which is shown more clearly in Fig. 4. This die includes a removable tubular shell 101 of a given diameter and may be provided with a collar having a flange seated in a refractory support.

The supporting material for the shell is of low heat conductivity and may consist of alundum. It has been found that by making the shell or liner of a sheet of alloy, such as an alloy consisting of ten per cent rhodium and ninety per cent platinum, an outlet aperture is provided which does not change by reason of wear during long periods of use. The backing material of low heat conductivity makes it possible to keep the temperature of the flowing material constant. As it flows from the perimeter 104 of the die, the material necks-down to a definite dimension along the length 105 of the stream. This reduced diameter of the stream is controlled by the initial flow from the die 14 and pyrometer 17 may be focused so that an image 106, see Figs. 5 and 6, may be projected on a target 107 of the pyrometer. As shown, the image may be of less area than that of the target.

In Figs. 5 and 6 the image of the stream at the optimum temperature is indicated in dotted lines and the cross hatched portion indicates the increase in area as the temperature increases.

It will, therefore, be evident that by reason of the novel arrangement of the elements employed, the pyrometer not only acts directly in accordance with temperature changes, but also responds to variation of the diameter of the stream so that both temperature and volume are controlled.

When the temperature of the stream rises, the area thereof increases, as diagrammatically indicated in Fig. 5, and the target absorbs a greater amount of heat energy, thus causing electrical current to flow in the circuits provided and operate mechanism which lowers the temperature of the furnace. As the temperature of the furnace is lowered, the temperature of the stream drops and the area of the image decreases, as shown in Fig. 6. Thus less heat energy is absorbed by the target, varying the amount of electrical energy flowing in the circuits, with the result that the furnace temperature is raised.

As above pointed out, the present invention makes it possible to control the temperature of a glass stream through the agency of means responsive to temperature variations. It will be understood that by controlling the temperature of the stream the volume is controlled, insofar as the diameter of the stream increases with increased temperature. The volume or amount of glass delivered is of extreme importance, particularly when it is necessary to deliver a relatively fine stream of glass. The volume of glass delivered is dependent upon the depth of the molten glass in the furnace and the pressure created in the furnace of the chamber above the surface of the molten glass.

It is the practice to intermittently replenish the furnace and maintain a given level. However, the pressure, by reason of the combustible gases, varies and the diameter of the stream delivered is often increased with a consequent increase in the volume of glass delivered by reason of an increase in the pressure in the furnace.

By reason of the present novel arrangement of the heat responsive means wherein the projected image is of less area than the target, it is possible to control the diameter of the stream and regulate the temperature of the furnace in the event that the temperature of the stream does not change but a change occurs in its diameter.

For example, a variation in the degree of pressure within the furnace may increase or decrease the area of the image projected on the target. Thus the heat energy absorbed by the target will vary with a consequent variation in the flow of current in the electrical circuit affected.

As long as the temperature and diameter of the stream are maintained within predetermined limits to provide for a regulated flow of the glass, the desired results will be obtained, and this is accomplished by reason of the present novel arrangement of the various cooperating elements.

Although satisfactory results have been obtained by the use of a radiation pyrometer it is to be understood that, in accordance with the present invention where the glass stream is maintained of uniform area in transverse cross section, other devices may be employed. For example, in Fig. 7, a thermocouple 110 is shown applied directly to the lining of the die so that variations in the degree of temperature of the glass stream will cause a variation in the flow of electrical energy by reason of the thermocouple which may be connected to conductors 37 and 38 and the electrical response utilized in the same manner as when the radiation pyrometer is employed. On the other hand, the temperature of the stream may be controlled by reason of the amount of emanated light upon the effective surface of a photoelectric cell, which may in turn cause a flow of electrical energy to be utilized in controlling the amount of heat energy supplied to the furnace.

Although a preferred embodiment of the invention is shown and described herein, it is to be understood that the method and apparatus disclosed may be varied or modified without departing from the spirit and scope of the appended claims.

We claim:

1. The method of controlling the temperature of a continuous stream of molten glass flowing from a glass furnace which comprises supplying heat energy to said glass and varying the heat energy supply in accordance with the temperature variations of said stream, as indicated by the intensity of the heat radiated therefrom.

2. The method of controlling the temperature of a continuously moving stream of molten glass which comprises supplying heat energy to said glass, discharging the glass from an outlet orifice of constant area, and varying the heat energy supply in accordance with variations in the intensity of heat energy radiated from a portion of the stream.

3. The method of controlling the viscosity of a continuously moving stream of molten glass which comprises supplying heat energy to render said glass fluid, discharging the glass in a stream from an outlet orifice of constant area, and utilizing the radiant energy emanating from a portion of said stream to vary the heat energy supply to said glass.

4. The method of controlling the temperature of a stream of glass continuously flowing from a glass furnace, which comprises directing said stream through an outlet of uniform area, and utilizing the heat radiated from a portion of said stream of uniform area to control the temperature of said stream.

5. The method of controlling the viscosity of a batch of molten glass which comprises supplying sufficient heat energy to bring the glass to a predetermined degree of fluidity, causing the molten glass to flow in a continuous stream through an orifice of uniform area, directing radiant energy from a portion of said stream onto a heat energy absorbing element, and varying the supply of heat energy to said batch of glass in accordance with the variation in the heat energy absorbed by said element.

6. An apparatus for controlling the temperature of a stream of molten glass comprising a container for said glass, means for heating the glass to a molten condition, an orifice of uniform area through which said glass flows continuously in the form of a stream, and means for regulating said heating means to maintain said stream at a constant temperature.

7. An apparatus for controlling the temperature of a continuously moving stream of molten glass comprising a container for a quantity of glass, means for heating said glass to a molten condition, an orifice in said container for allowing a continuous flow of said glass therefrom, and means responsive to heat energy radiated from a portion of said stream for controlling said heating means.

8. An apparatus for controlling the temperature of a continuously moving stream of molten glass comprising a container for a quantity of glass, an element for heating said glass to a molten condition, means for causing said glass to flow continuously from said container, an electrical circuit including electrically operating means for regulating said heating element, and means operative in accordance with the temperature of said stream for causing a flow of electrical energy in said circuit.

9. An apparatus for controlling the temperature of a continuous stream of molten glass comprising a furnace, means for causing a stream of glass to flow from said furnace, electrically controlled means for varying the temperature of said furnace, an electrical circuit including said electrically controlled means, and means disposed adjacent to the path of said stream and responsive to variations in the temperature of said stream for causing a flow of temperature controlling electrical energy in said circuit.

10. An apparatus for controlling the temperature of a stream of molten glass comprising a container for a quantity of glass, a burner for heating said glass to a molten condition, means for causing said glass to flow in the form of a continuous stream, an electrical circuit including means operable upon a flow of electrical energy to regulate the fuel supply to said burner, and heat responsive means disposed adjacent to the path of travel of said stream for causing a flow of electrical energy in said circuit.

11. An apparatus for controlling the temperature of a stream of molten glass comprising a container for said glass, means for heating said glass to render the same fluid, means for delivering said fluid from said furnace in a stream through an orifice having a uniform diameter, a radiation pyrometer external of the furnace, having a thermocouple disposed adjacent to the path of flow of said stream, an electrical circuit including the thermocouple of said pyrometer, electrically operable means for regulating the temperature of said furnace, and a relay controlling said electrically operable means in accordance with the flow of electrical energy through said thermocouple caused by temperature variations in said moving stream.

12. An apparatus for controlling the temperature of a continuous stream of molten material comprising a container, means for producing a stream of said material constantly flowing therefrom, an electrical circuit, means operable upon a flow of electrical energy in said circuit for changing the temperature of said stream, and means responsive to radiant energy disposed adjacent to the path of flow of said stream for causing a flow of electrical energy in said circuit to operate the second mentioned means.

13. An apparatus for controlling the temperature of a continuous stream of molten glass by regulating the temperature of a glass furnace comprising means for producing a constantly flowing stream of molten glass from said furnace including a fluid burner, fluid supply regulating means, an electrical circuit, electrically operable means in said circuit for operating said regulating means, another electrical circuit including electrically operable means for causing a flow of electrical energy in said first mentioned circuit and means disposed adjacent to the path of said stream and responsive to variations in the temperature thereof to cause a flow of electrical energy in said second mentioned circuit to operate said regulating means.

14. An apparatus for controlling the temperature of a stream of molten glass by regulating the temperature of a glass furnace comprising means for producing a constantly flowing stream of molten glass from said furnace including a fluid burner, fluid supply regulating means, an electrical circuit, electrically operable means in said circuit for operating said regulating means, another electrical circuit including electrically operable means for causing a flow of electrical energy in said first mentioned circuit, an electric thermo-couple for causing a flow of electrical energy in said last named circuit, means for supporting said thermo-couple adjacent to the path of flow of said glass, and means for directing radiant energy radiated from a portion of said stream onto said thermo-couple whereby a flow of electrical energy in said last named circuit causes a flow of electrical energy in said first named circuit to operate said regulating means.

15. An apparatus for controlling the temperature of a stream of molten glass by regulating the temperature of a glass furnace, comprising a fluid burner, fluid supply regulating means, an electrical circuit, electrically operable means in said circuit for operating said regulating means, another electrical circuit including electrically operable means for causing a flow of electrical energy in said first mentioned circuit, an electric thermo-couple disposed adjacent to the path of flow of said stream, means for directing radiant energy from a portion of said stream onto said thermo-couple for causing a flow of electrical energy in said last named circuit, means for causing a stream of glass to flow from an orifice in said furnace and means responsive to temperature variations of said stream to cause electrical energy to flow in said last named circuit whereby electrical energy flows in said first named circuit to cause an operation of said regulating means.

16. An apparatus for controlling the temperature of a stream of molten glass by regulating the temperature of a glass furnace from which said stream flows comprising a fluid burner for heating said furnace, fluid supply regulating means, an electrical circuit, a movable member for controlling the flow of electrical energy in said circuit, electrically operable means in said circuit for operating said regulating means, means responsive to heat radiated from a portion of said stream and disposed adjacent to the path thereof for causing a movement of said member whereby electrical energy flows in said circuit to control said regulating means.

17. The method of controlling the temperature and cross sectional area of a stream of molten material which comprises supplying heat energy to said material, projecting on the target of a heat responsive instrument an image of said stream of less area than the area of the target, and in varying the heat energy supply to said material in accordance with variations in the temperature and area of the projected image.

18. The method of controlling the temperature of a stream of molten glass flowing from a furnace, comprising employing the heat radiated from a portion of said stream to vary the relationship between the segments of a resistance on either side of a sliding contact so that a circuit between said resistance and a potentiometer resistance, having a sliding contact the relative position of which is controlled by a reversible motor, and which has its ends connected to the ends of the balancing resistance and its sliding contact connected to that of the balancing resistance, causes relays to operate, when the temperature of the stream varies from normal, and energize said motor to adjust the intensity of said furnace, one way or the other, to restore the temperature of said glass to that desired for normal operation.

19. Apparatus for controlling the temperature of a stream of molten glass flowing from a furnace comprising a radiation pyrometer sighted on a portion of said stream, a galvanometer in circuit with said pyrometer, a balancing resistance, a shaft carrying means for varying the relationship between the segments on either side of a sliding contact, control mechanism for rotating the shaft one way or the other in accordance with the deflection of the galvanometer needle, a reversible motor, a burner for heating the glass in the furnace, a control valve for said burner, mechanism connecting said motor and control valve for regulating the intensity of the burner to adjust the temperature of the glass, a potentiometer resistance connected to the balancing resistance at its ends, a sliding contact for said resistance, a connection between said sliding contact and that for the balancing resistance, said potentiometer resistance being so connected to the motor that movement of the latter adjusts the relation between the segments of said resistance on either side of the sliding contact, relay means controlled by the relation between the segments at either side of the sliding contact of the balancing resistance, and a source of power so controlled by said relay means that when the temperature of the stream of molten glass varies one way or the other from normal, the sliding contact of the balancing resistance cuts out resistance at one side or the other and increases the resistance at the other side, thereby operating the relay means to cause the reversible motor to move in one direction or the other to adjust the temperature of the glass to that desired, said adjusting movement of the motor continuing until the sliding contact of the related potentiometer resistance reaches a point restoring the circuits between the potentiometer and balancing resistances to normal, and discontinuing the relay operation and energization of the motor.

HENRY K. RICHARDSON.
FRANK A. NEWCOMBE.